United States Patent
Li et al.

(10) Patent No.: US 11,927,113 B2
(45) Date of Patent: Mar. 12, 2024

(54) COMPOSITE FAN BLADE AIRFOIL, METHODS OF MANUFACTURE THEREOF AND ARTICLES COMPRISING THE SAME

(71) Applicant: RTX Corporation, Farmington, CT (US)

(72) Inventors: Xuetao Li, South Glastonbury, CT (US); Peter Finnigan, Higganum, CT (US); Nicholas D. Stilin, Higganum, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/881,954

(22) Filed: Aug. 5, 2022

(65) Prior Publication Data

US 2023/0051131 A1 Feb. 16, 2023

Related U.S. Application Data

(60) Provisional application No. 63/230,506, filed on Aug. 6, 2021.

(51) Int. Cl.
*F01D 5/28* (2006.01)

(52) U.S. Cl.
CPC .......... *F01D 5/282* (2013.01); *F05D 2220/36* (2013.01); *F05D 2300/6034* (2013.01)

(58) Field of Classification Search
CPC ........................ F01D 5/282; F05D 2300/6034
See application file for complete search history.

(56) References Cited

U.S. PATENT DOCUMENTS

| | | | |
|---|---|---|---|
| 5,375,978 A | 12/1994 | Evans et al. | |
| 8,123,463 B2* | 2/2012 | Kray | F01D 5/282 29/889.6 |
| 10,654,246 B2 | 5/2020 | Xie et al. | |
| 10,830,062 B2 | 11/2020 | Paquin et al. | |
| 2011/0176927 A1 | 7/2011 | Alexander et al. | |
| 2018/0094525 A1 | 4/2018 | Roberts et al. | |
| 2018/0216477 A1 | 8/2018 | Kittleson et al. | |
| 2020/0102968 A1 | 4/2020 | Thomas | |
| 2021/0140334 A1* | 5/2021 | Sudre | F01D 11/001 |

FOREIGN PATENT DOCUMENTS

| | | |
|---|---|---|
| EP | 2149711 A2 | 2/2010 |
| EP | 2299123 A2 | 3/2011 |
| EP | 3517732 A1 | 7/2019 |

OTHER PUBLICATIONS

Extended European Search Report for EP Application No. 22189343. 1; Report dated Dec. 13, 2022 (6 pages).

* cited by examiner

*Primary Examiner* — Michael L Sehn
(74) *Attorney, Agent, or Firm* — CANTOR COLBURN LLP

(57) ABSTRACT

A fan blade comprises interleaved plies, where interleaving comprises distributing wide plies within narrow plies and short plies within long plies in the fan blade; wherein the interleaving is defined as an actual intersection of a plurality of plies of different variable dimensions that extend in the chordwise direction with another plurality of plies of different variable dimensions that extend in the spanwise direction such that their respective longitudinal axes intersect with one another at angles of 5 to 175 degrees.

18 Claims, 9 Drawing Sheets

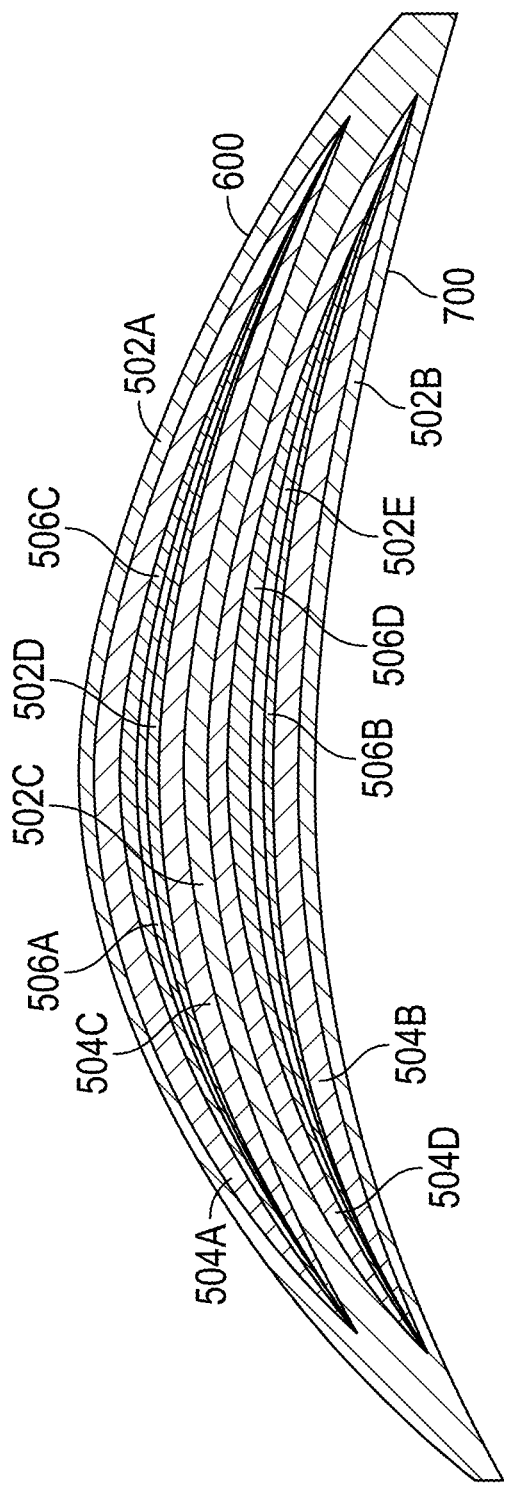
FIG. 3A3

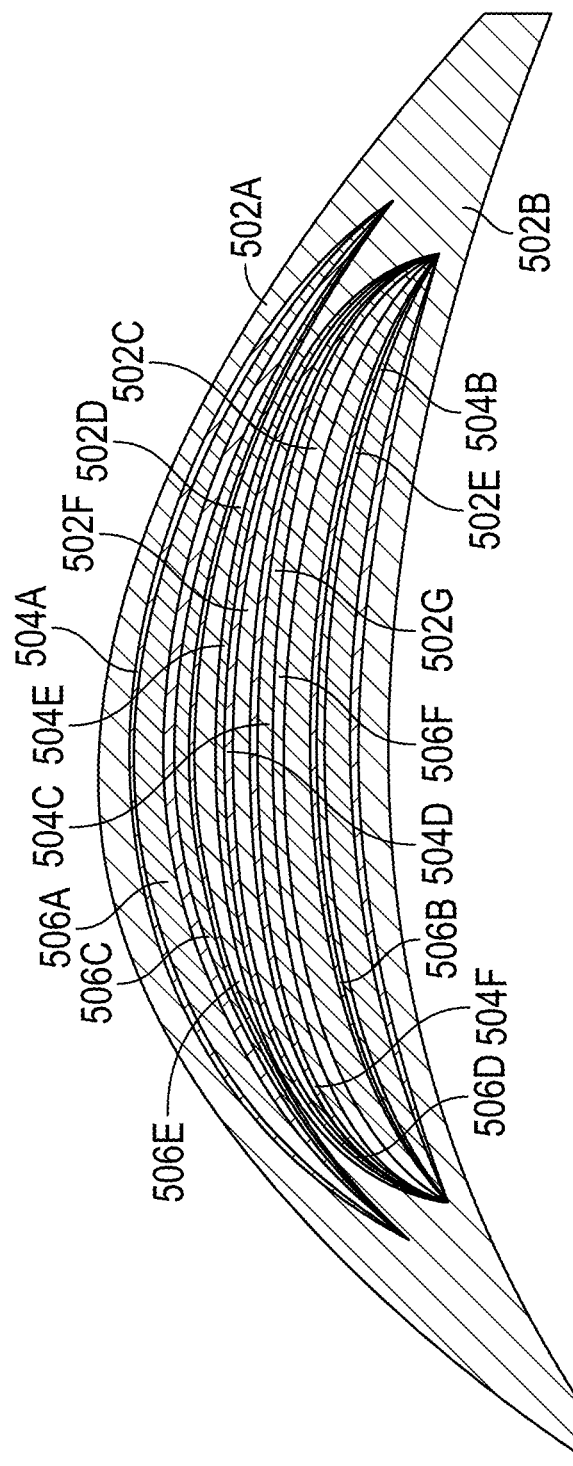
FIG. 3A4

COMPOSITE FAN BLADE AIRFOIL, METHODS OF MANUFACTURE THEREOF AND ARTICLES COMPRISING THE SAME

CROSS-REFERENCE TO RELATED APPLICATIONS

This application claims the benefit of U.S. Application No. 63/230,506 filed Aug. 6, 2021, the disclosure of which is incorporated herein by reference in its entirety.

BACKGROUND

This disclosure relates to a composite fan blade airfoil, methods of manufacture thereof and articles comprising the same. In particular, this disclosure relates to composite fan blades that contain shuffled plies to provide better reinforcement and strength to the fan blade.

Fan blade airfoils are composed of hundreds of prepreg, unidirectional prepreg tows, that fill the blade volume. In order to improve structural performance design iteration and optimization are conducted with ply layups for hundred plies. Ply layup comprises two primary sets of parameters: ply orientation and ply stack sequence. Ply orientation defines fiber angle for each individual unidirectional ply. Optimization processes of ply orientation evaluates and manages stress or strain at each ply and all critical locations, with the goal of driving maximum use of material (primarily fiber strength). The ply stacking sequence defines the relationship of one ply to its neighbors. The goal of staggering plies with different boundaries, results in dispersing and interleaving long and short plies. This is done in such a way as to breakup naturally occurring crack initiating sites in resin rich regions and to mitigate crack propagation by creating a more complex crack growth paths that could attenuate failure.

FIG. 1 is an exemplary depiction of an airfoil 100 where none-shuffled ply stacking is used in the ply layup with a volume filling scheme. None-shuffled implies that the plies are not shuffled. The airfoil 100 has a leading edge 202 and a trailing edge 204 and the plies 102, 104, 106 are systematically distributed between the outer surface (suction surface) or the lower surface (pressure surface) of the airfoil and the central region of the airfoil. From the FIG. 1 it may be seen that the largest plies 102 (chordwise) are located on the outer surfaces (the upper and lower camber) of the airfoil, while the smallest plies 106 (chordwise) are located at the interior, with the mid-sized plies 104 (chordwise) being distributed between the outermost plies and the innermost plies. The chord is a curve that that extends from the leading edge to the trailing edge and is at the mean of the pressure and suction side of the airfoil. The term "chordwise" implies a path along or parallel to the chord.

This design has several drawbacks notably that concentration of short, small area, plies and long plies provides interlaminar crack paths that can propagate from the leading edge to the trailing edge or from the outer radius (tip) of the blade to the inner radius of the blade. The segregation of long plies to one portion of the airfoil and short plies to another part of the airfoil prevents the development of crack arresting mechanisms that can improve damage tolerance and mitigate crack initiation and growth. There is therefore a need to develop airfoils where plies can be dispersed to increase crack mitigating mechanisms to improve damage tolerance.

SUMMARY

Disclosed herein is a fan blade that comprises interleaved plies, where interleaving comprises distributing wide plies amongst narrow plies in the fan blade. The interleaving is defined as an actual intersection of a plurality of plies of different variable dimensions that extend in the chordwise direction with another plurality of plies of different variable dimensions that extend in the spanwise direction such that their respective longitudinal axes intersect with one another at angles of 5 to 175 degrees.

In an embodiment, the wide plies and narrow plies are staggered chordwise with spanwise staggered long and short plies, or vice versa.

In yet another embodiment, interleaving comprises shuffling short plies with long plies in the spanwise direction, wide plies within narrow plies in the chordwise direction and thick plies with thin plies in the thickness direction to avoid segregating plies of one particular dimension from plies of another particular dimension.

In yet another embodiment, shuffling comprises splitting plies of different sizes and interspersing them in the fan blade such that there is no progressive dimensional sequencing of ply size in any one particular direction from a given ply in the fan blade.

In yet another embodiment, the interleaving is conducted so as to render delamination pathways more tortuous when compared with fan blades where there is no interleaving, thus reducing the speed at which delamination progresses.

In yet another embodiment, the angle of intersection between the respective longitudinal axes is 50 to 150 degrees.

In yet another embodiment, the angle of intersection between the respective longitudinal axes is 70 to 120 degrees.

In yet another embodiment, the interleaved plies comprise fibers that comprise silicon carbide, oxide ceramics and carbon.

In yet another embodiment, the interleaved plies comprise matrices that comprise SiC, $Al_2O_3$, BN, $B_4C$, $Si_3N_4$, $MoSi_2$, $SiO_2$, SiOC, SiNC SiONC, or a combination thereof.

In yet another embodiment, the interleaved plies produce fewer regions of resin concentration relative to fan blades that that do not contain interleaved plies.

Disclosed herein is a method of manufacturing a fan blade comprising shuffling plies in a fan blade prior to contacting the plies with one another such that they form interleaved plies. Interleaving comprises distributing wide plies within narrow plies and short plies within long plies in the fan blade. Interleaving is defined as an actual intersection of a plurality of plies of different variable dimensions that extend in the chordwise direction with another plurality of plies of different variable dimensions that extend in the spanwise direction such that their respective longitudinal axes intersect with one another at angles of 5 to 175 degrees. The interleaved plies are then consolidated and cured together to form the fan blade.

In an embodiment, shuffling comprises splitting plies of different sizes and interspersing them in the fan blade such that there is no progressive dimensional sequencing of ply size in any one particular direction from a given ply in the fan blade.

In another embodiment, bonding the interleaved plies comprises increasing the pressure and temperature on the plies.

In yet another embodiment, the shuffling is prescribed by a computer.

In yet another embodiment, interleaving comprises shuffling short plies with long plies in the spanwise direction, wide plies within narrow plies in the chordwise direction and thick plies with thin plies in the thickness direction to avoid segregating plies of one particular dimension from plies of another particular dimension.

In yet another embodiment, the interleaved plies produce fewer regions of resin concentration relative to fan blades that that do not contain interleaved plies.

In yet another embodiment, the angle of intersection between the respective longitudinal axes is 50 to 150 degrees.

In yet another embodiment, the angle of intersection between the respective longitudinal axes is 70 to 120 degrees.

BRIEF DESCRIPTION OF THE FIGURES

FIGS. 3A3 and 3A4 are shown in an expanded view for the benefit of the reader;

DETAILED DESCRIPTION

Figure 1:
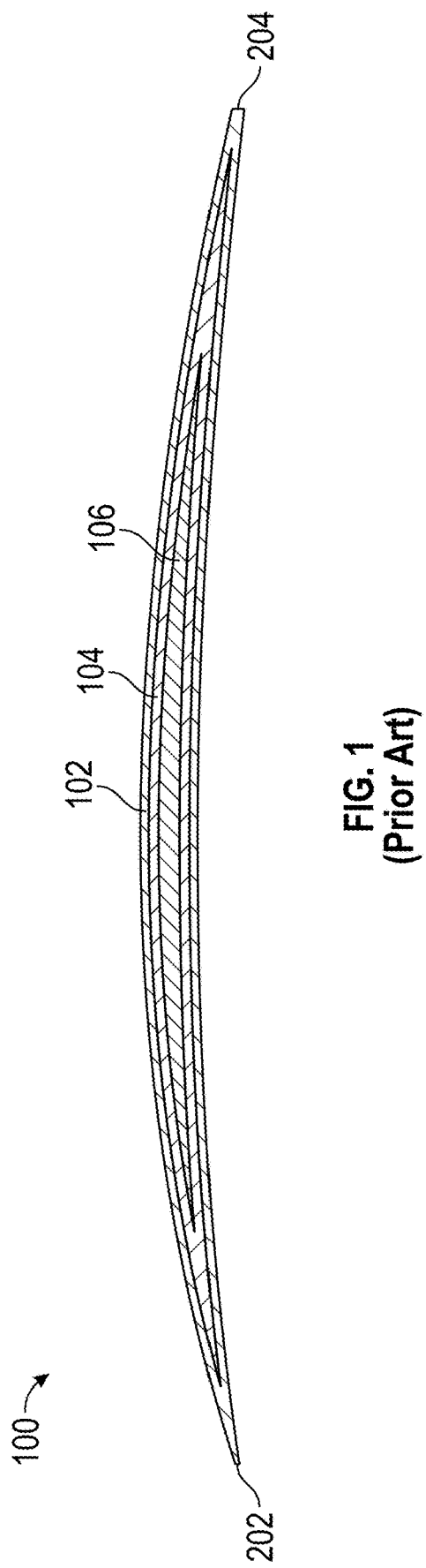
FIG. 1 is a schematic depiction of the distribution of plies in a conventional uni-ply prepreg tape fan blade.

Disclosed herein is a tailorable shuffling scheme for manufacturing a laminated composite fan blade by Automated Fiber Placement (AFP). The method expands design space and manufacturing flexibility towards a goal of improving fan blade overall impact and mechanical performance. The method comprises shuffling plies chordwise and/or spanwise through the thickness (from pressure to suction sides) and the span (from outer diameter to inner radius) of the composite fan blade to distribute wide plies within narrow plies and short plies within long plies. The term shuffling includes splitting plies of different sizes and interspersing them in the fan blade such that there is no particular long range progressive dimensional (length, width and/or thickness) sequencing of ply size in any one particular direction from a given ply in the fan blade.

Progressive dimensional sequencing implies that there is a gradual change in any particular dimension (length, width and/or thickness) in a particular direction. For example, there may be at least three neighboring plies of gradually varying size (increasing or decreasing) before there is an abrupt change in the dimensional direction. For example, the first ply may be the widest, the second ply adjacent the first ply may be a little narrower than the first ply, and the third ply adjacent the second ply may be narrower than the second ply. However, the fourth ply will be wider than at least the third ply. The fifth ply will be either wider than the fourth ply or narrower than the second ply.

In another embodiment, wide and narrow plies are re-staggered chordwise with the aforementioned spanwise long and short plies, or vice versa. The ability to shuffle long and short plies and re-stagger wide and narrow plies within the fan blade provides the designer with an ability to control the spatial dispersion of resin rich regions within the volume of an airfoil. It can facilitate avoidance of the creation of planes with accumulated undesirable features and improve overall interlaminar capabilities. The ply dimensions and location can be adjusted to balance material tensile strength at the outer surface and shear strength at mid-plane. In addition, delamination can be initiated and confined to certain local ply interfaces.

More specifically, the method comprises shuffling short plies with long plies in the spanwise direction, wide plies within narrow plies in the chordwise direction and thick plies with thin plies in the thickness direction to avoid segregating plies of one particular dimension from plies of another particular dimension. The segregation of plies often provides a clean delamination path leading from one surface of the wing to another surface (e.g., suction side to pressure side or to trailing edge, to leading edge). By forming an interleaved layup along any imaginary straight plane or line from the suction side to the pressure side (or spanwise from the outer diameter to inner radius or chordwise from leading edge to trailing edge) of the composite fan blade, the pathway (of a crack) to a clean delamination is made tortuous thus preventing the crack from easily propagating and potentially leading to greater damage. In an embodiment, the interleaving is conducted so as to render delamination pathways more tortuous when compared with fan blades where there is no interleaving, thus reducing the extent to which delamination (of plies) may progress.

Layered structures define a wide variety of construction arrangements, including lightweight laminated composite articles. Laminated composites typically are defined by a continuous, essentially planar array of continuous fibers embedded in a matrix defining a lamina or ply, a plurality of plies forming a laminate composite. These composite articles can be arranged to meet various in-plane stiffness or strength needs by appropriate stacking of similar orthotropic plies of dissimilar orientation. Ceramic matrix composites generally comprise fibers that comprise silicon carbide, oxide ceramics, carbon, or a combination thereof. Exemplary matrix materials include SiC, $Al_2O_3$, BN, $B_4C$, $Si_3N_4$, $MoSi_2$, $SiO_2$, SiOC, SiNC SiONC, or a combination thereof. An exemplary combination of fiber and matrix (in a CMC) is silicon carbide fibers and a silicon carbide matrix.

Figure 2A:
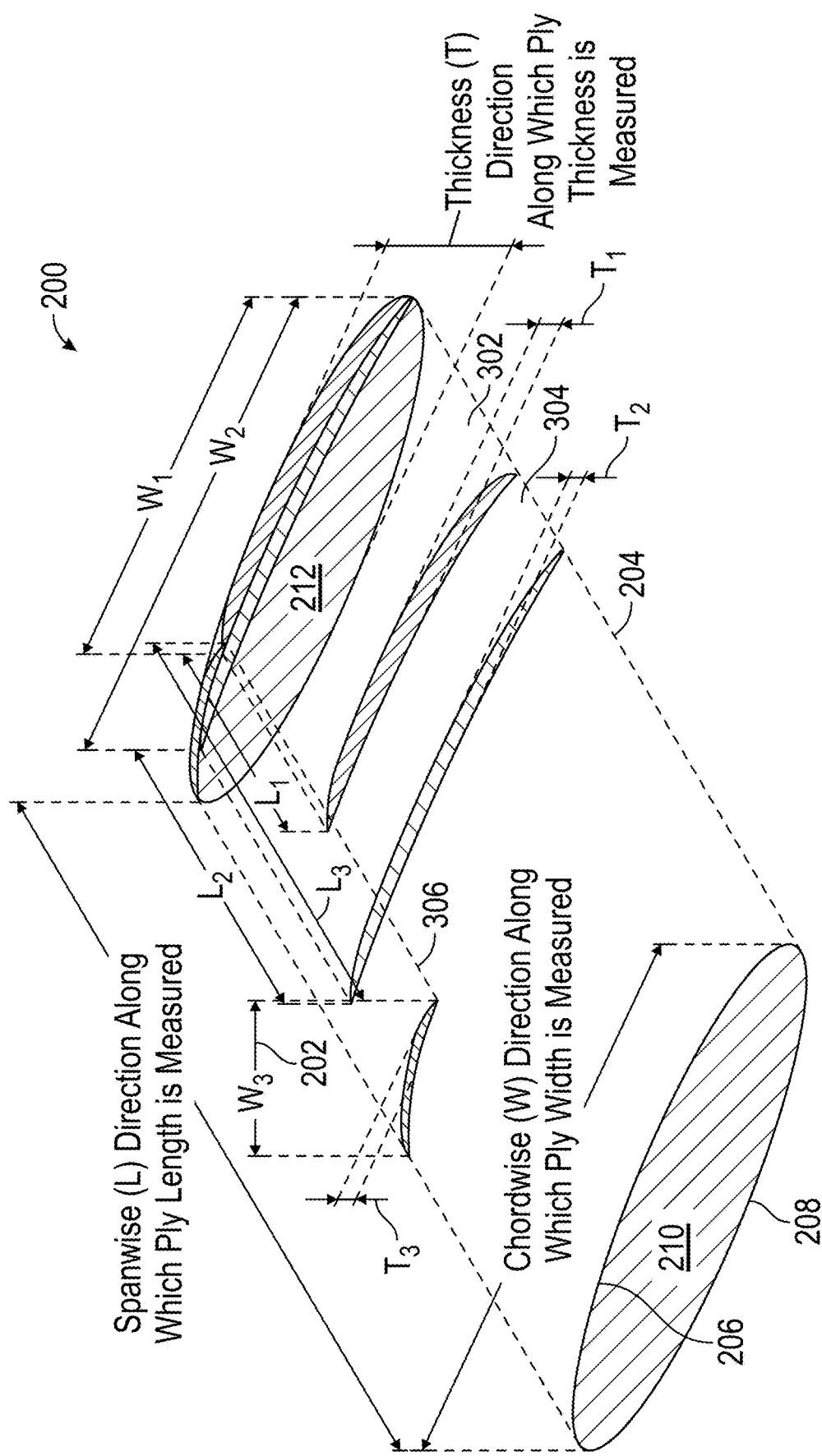
FIG. 2A is an exemplary schematic isometric depiction of a fan blade that contains staggered plies of different sizes.
Figure 2B:
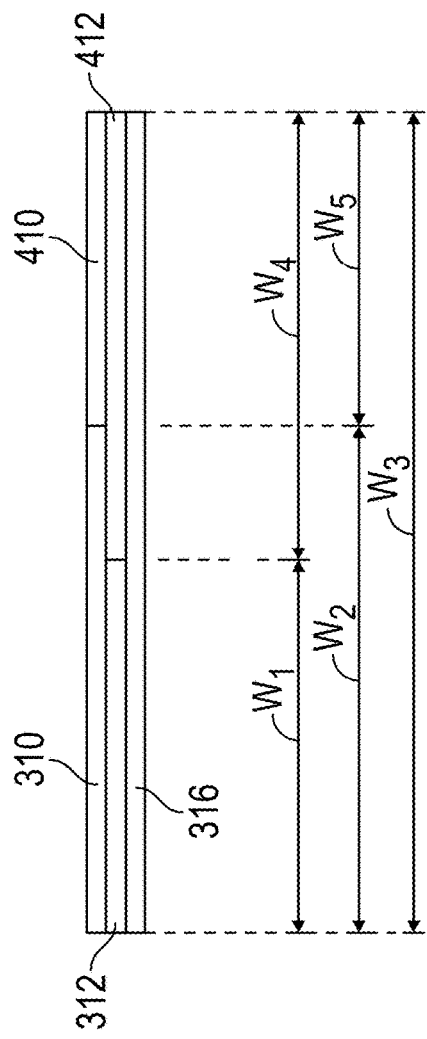
FIG. 2B is an exemplary schematic depiction of plies that extend in the chordwise direction that intersect with plies that extend in the chordwise direction.
Figure 2C:
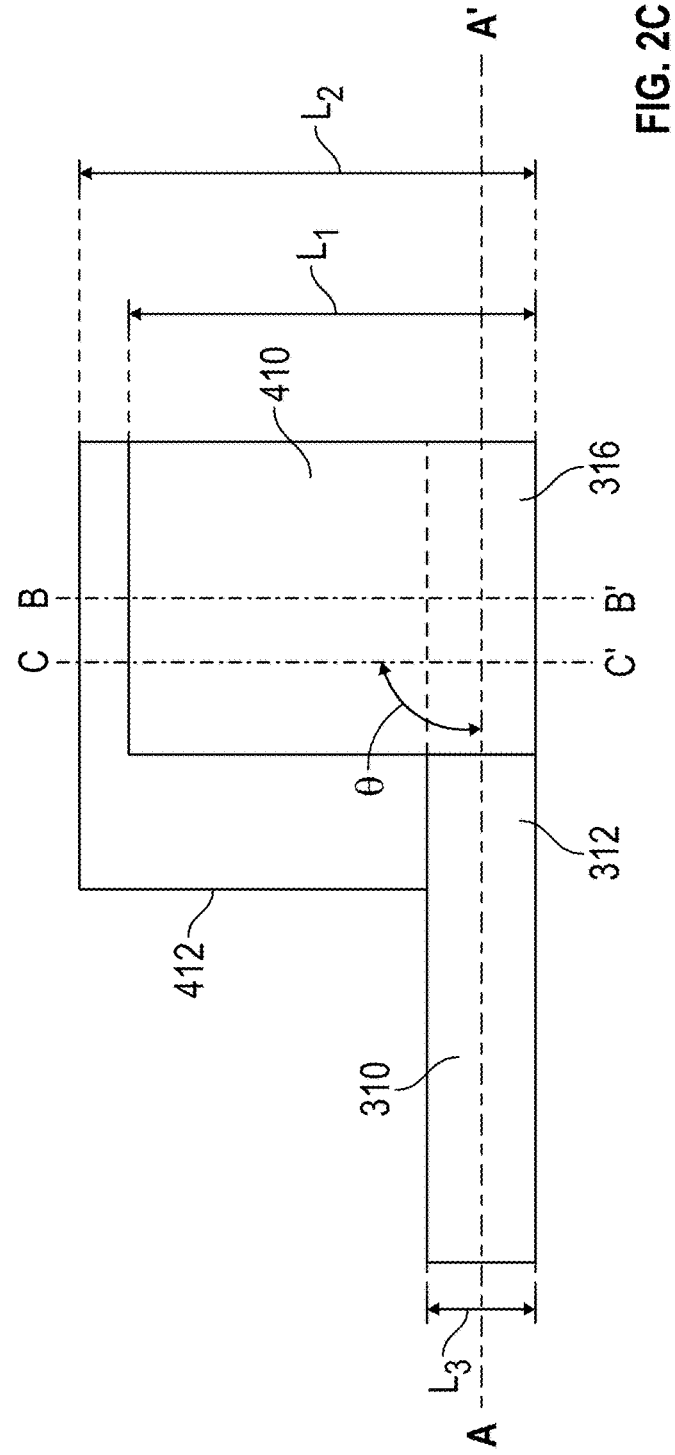
FIG. 2C is an exemplary schematic depiction of the plies of the FIG. 2B when viewed in the spanwise direction.

FIGS. 2A, 2B and 2C are depictions of an exemplary composite fan blade 200 that details terms such as thicknesswise, chordwise and spanwise. These figures also attempt to show a basic example of the interleaving of plies. FIG. 2A provides a rough isometric view illustrating a layup that includes long and short plies (when viewed spanwise) interleaved with wide and narrow plies (when viewed chordwise). FIG. 2B is a chordwise view of interleaving, while FIG. 2B is a spanwise view of the interleaving.

The fan blade 200 comprises a leading edge 202 and a trailing edge 204. The suction surface 206 is opposed to the pressure surface 208. Left wingtip 210 opposes right wingtip 212. As noted above, the chord is an imaginary curve that extends from the leading edge to the trailing edge. The term "chordwise" implies a path along or parallel to the chord and is the direction in which ply width (W) is measured. The span is measured from left wingtip 210 to right wingtip 212 in a radial direction. The term "spanwise" implies a path along or parallel to the span and is the direction along with length (L) of the ply is measured. The thickness is measured from the suction surface 206 to pressure surface 208 and the term "thicknesswise" implies a path from the upper surface to the lower surface along which thickness (T) is measured. Each of the thickness (T), width (W) and length (L) is measured perpendicular to the other two dimensions. For example, thickness (T) is measured from suction surface to the pressure surface in a direction that is perpendicular to the chord and the span.

With reference now again to the FIG. 2A, the fan blade 200 comprises a first ply 302 having a first width $W_1$ and length $L_1$ is disposed atop a second ply 304 having a second width $W_2$ and length $L_2$, such that $W_1$ is less than $W_2$ and $L_1$ is greater than $L_2$. A third ply 306 having width $W_3$ and length $L_3$ is disposed adjacent the first ply 302 and atop the second ply 304 such that $W_3$ is smaller than $W_1$ and $W_2$, but $L_3$ is greater than $L_1$ an $L_2$. This thickness of the plies are also different from one another. The first ply has a thickness $T_1$ that is greater than the thickness $T_2$ but less than the thickness $T_3$. By interleaving plies of different lengths, widths and thicknesses in a volume filling manner such that that the geometry and the dimensions of the fan blade 200 are not changed, a crack will have to propagate in a tortuous manner through the volume of the fan blade in order to bring about component failure. This increases resistance to failure and extends part life.

FIGS. 2B and 2C depict a chordwise and spanwise views respectively of interleaved plies to enable a clearer definition of interleaving. FIG. 2B shows plies 310, 312 and 316 that have widths that are greater than their lengths. Ply 310 has a width $W_2$, ply 312 has a width $W_1$ and ply 316 has a width $W_3$ with $W_3 > W_2 > W_1$. The plies 310, 312 and 316 share longitudinal axis AA'. The length of each of these plies is $L_3$ and is measured spanwise, while the widths $W_1$, $W_2$ and $W_3$ are measured chordwise. From the FIG. 2C, it may be seen that plies 410 and 412 have lengths $L_1$ and $L_2$ respectively measured in the spanwise direction that are greater than their widths $W_5$ and $W_4$ respectively measured in the chordwise direction. Plies 410 and 412 have longitudinal axes BB' and CC' respectively that are inclined at an angle θ with respect to the longitudinal axis AA' of the plies 310, 312 and 316. The angle θ is then angle between the longitudinal axes of plies that extend in the chordwise direction with the longitudinal axes of plies that extend in the spanwise direction. The angle θ may vary between 5 degrees and 175 degrees, preferably 50 degrees to 150 degrees.

From FIGS. 2B and 2C it may be seen that the longitudinal axes of the plies that extend chordwise intersect with the longitudinal axes of plies that extend spanwise. Interleaving is therefore defined as an actual intersection of a plurality of plies of different variable dimensions that extend in the chordwise direction with another plurality of plies of different variable dimensions that extend in the spanwise direction such that their respective longitudinal axes intersect with one another at angles of 5 to 175 degrees, preferably 50 to 150 degrees.

A tortuous path is one that weaves back and forth because it is obstructed by plies that have been deliberately put in its path to prevent it from traveling uniformly in one direction. In an embodiment, the tortuous path makes at least one change in direction of at least 90 degrees, preferably at least 120 degrees, and more preferably at least 150 degrees.

In other words, the shuffling of plies by interspersing short plies with long plies provides the composite fan blade with a "rest" or "braking" mechanism where delamination (in the form of crack propagation) is suppressed when it beings to propagate thicknesswise, chordwise, spanwise, or in a combination of directions thereof. When a propagating crack encounters a ply in its path it either stops propagating or has to take "another" path to continue propagating. This taking of "another" path decreases the extent of crack propagation from one end of the fan blade to another and thereby increases the composite fan blade robustness by preventing large scale damage to the component. This method of arresting or mitigating crack propagation has the potential to increase damage tolerance of the fan blade under impact events including bird strike, fan blade-out, ice and hail conditions.

Figure 3A:
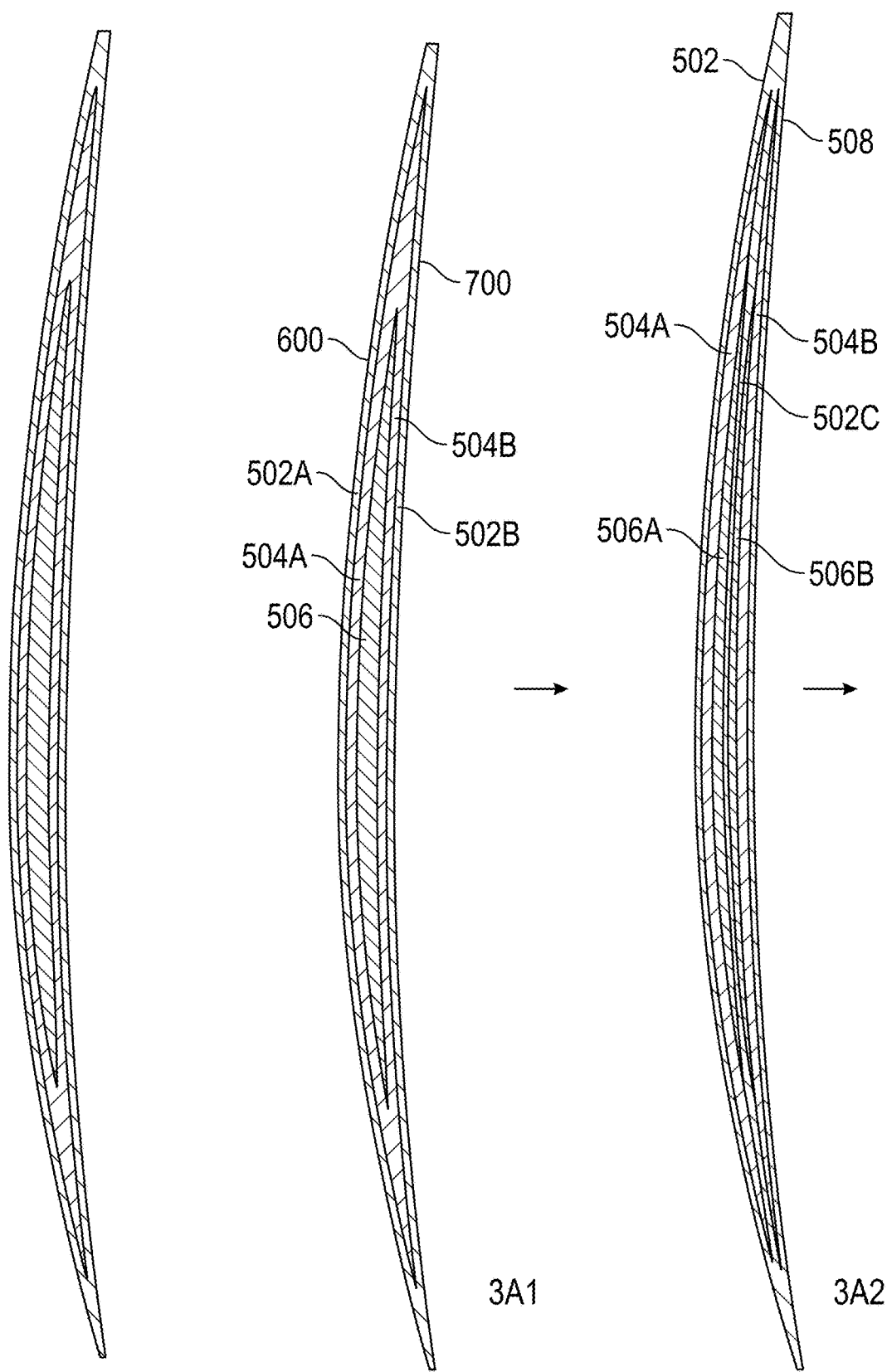
FIG. 3A is an exemplary depiction of a chordwise cross-section of a fan blade that shows the effect of shuffling plies in sequential views 3A1, 3A2, 3A3 and 3A4.
Figure 3A:
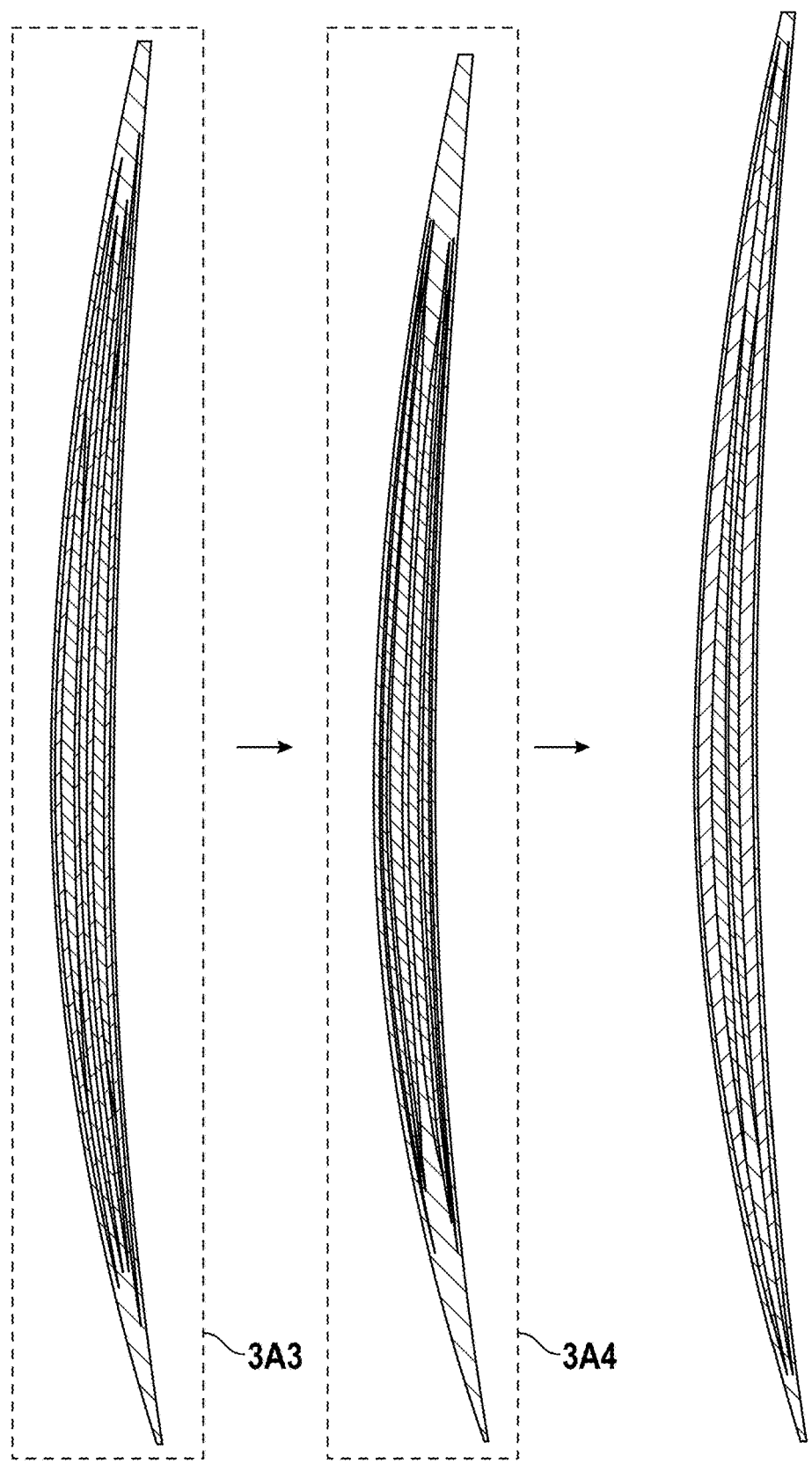

FIG. 3A depicts one exemplary method of shuffling of the wide and narrow plies within the composite fan blade. FIG. 3A represents a chordwise view of the same fan blade as the series of shuffles are made. In the FIG. 3A, the leading edge is denoted by LE while the trailing edge is denoted by TE. Here too the arrows point to each incremental change in the interleaving of the plies with each shuffle. The progression in interleaving is indicated by cross-sectional views 3A1 through 3A4, with 3A1 being the fan blade without interleaving due to shuffling, while 3A4 is the fan blade after the last shuffle. FIGS. 3A3 and 3A4 are shown again in expanded view for the benefit of the reader.

In view 3A1 of FIG. 3A, the suction surface 600 and the pressure surface 700 contact each other at the leading edge and trailing edge of the fan blade. The suction surface 600 and the pressure surface 700 comprise the widest plies 502A and 502B respectively. Located adjacent to the widest plies 502A and 502B (towards the center of the fan blade) are intermediate width plies 504A (hereinafter intermediate ply 504) and 504B respectively, while the narrowest length ply 506 (hereinafter narrowest ply 506) is located at the center of the fan blade. In view 3A1, the plies are sequentially arranged with the widest ply lying next to an intermediate ply, which lies next to the narrowest ply. Shuffling promotes a change in this size wise sequential distribution of the plies. The plies after shuffling staggered with no large size sequences (by ply size) in the fan blade.

In an embodiment, the narrowest ply is 30 to 70% of the size of the widest ply, while an intermediate ply is always wider than the narrowest ply and has a length that varies from 40 to 80% of the width of the widest ply.

While the FIG. 3A depicts only three ply lengths—the widest ply, the intermediate length ply and the narrowest ply, a composite fan blade may contain plies having 5 or more different lengths of plies based on the length of the widest ply. The Table below indicates 10 plies of different sizes based on the length (width) of the widest ply. The widest ply is Ply #10, while the narrowest ply is Ply #1 in the Table. All 10 plies indicated in the Table below do not have to be used in a composite. Any combination of 2 or more plies of different lengths from the Table may be used and shuffled as desired to produce the best resistance to stress and delamination.

TABLE

| Ply # | Width as a percentage of widest ply (Ply #10) |
|---|---|
| Ply #1 (narrowest ply) | 10 to 30 |
| Ply #2 (longer than ply #1) | 10 to 35, preferably 15 to 32 |
| Ply #3 (longer than ply #2) | 10 to 40, preferably 17 to 38 |
| Ply #4 (longer than ply #3) | 10 to 50, preferably 20 to 45 |
| Ply #5 (longer than ply #4) | 10 to 60, preferably 25 to 55 |
| Ply #6 (longer than ply #5) | 10 to 70, preferably 28 to 65 |
| Ply #7 (longer than ply #6) | 10 to 80, preferably 35 to 75 |
| Ply #8 (longer than ply #6) | 10 to 85, preferably 45 to 82 |
| Ply #9 (longer than ply #6) | 10 to 90, preferably 48 to 88 |
| Ply #10 (widestply) | 100 |

While the dimensions pertaining to ply size in the Table refer to the width of the plies, it can apply to any dimension such as, for example, length or thickness. In other words, the dimension of the smallest ply can be expressed as a percentage of that dimension of the longest ply—and that dimension can be width, length or thickness.

With reference now again to FIG. 3A, in a first shuffle seen in view 3A2, a portion of the widest plies 502A and 502B are shuffled to be in the center of the narrowest plies 506, splitting the narrowest plies 506 into two domains 506A and 506B that contact the opposing surface of the newest portion of the widest plies 502C. The thickness of the widest plies 502A and 502B are reduced by the amount of ply material used in 502C, while the original central region 506 is now split into two regions 506A and 506B. The combined thickness of 506A and 506B is equal to that of the original central region 506. With each shuffle, the thickness of the original plies is reduced. The reduction of thickness of a particular ply in one region is proportional to the increase of thickness of the particular ply in another region of the fan blade, thus maintaining a constant volume for the fan blade despite the displacement and rearrangement of the plies. As may be seen from the FIG. 3A (view 3A2), as a result of this first shuffle, there are now long plies interspersed with shorter plies.

In the second shuffle seen in view 3A3, the intermediate plies 504A and 504B are split (shuffled) into two more plies 504C and 504D that are disposed on and contact the widest ply 502C located in the center of the fan blade. The widest plies 502A, 502B and 502C are also split into two additional plies 502D and 502E that are dispersed amongst the narrowest plies 506A and 506B to produce plies 506C and 506D. With each shuffle, a previously existing thicker ply is narrowed and interspersed amongst plies of a different length. This as can be seen from the FIG. 3A3, the various plies detailed in sequence from the suction surface 600 to pressure surface 700 are widest ply 502A, intermediate ply 504A, narrowest ply 506A, widest ply 502D, narrowest ply 506C, intermediate ply 504C, widest ply 502C, intermediate ply 504D, narrowest ply 506D, widest ply 502E, narrowest ply 506E, intermediate ply 504B and widest ply 502B. It can thus be seen that with each shuffle there is a greater dispersion of plies of different sizes and order of the plies is no longer sequential (i.e., an intermediate ply may be dispersed between two narrowest plies instead of being dispersed between the narrowest ply and the widest ply as seen in the FIG. 3A1).

FIG. 3A (3A4) reflects one more shuffle and a greater mixing of the plies of different sizes. In the interests of brevity, the order of the plies will not be detailed one more time, but the reader can garner that there is a greater dispersion of plies of different sizes amongst one another.

While the arrangement depicted in the FIG. 3A shows the dispersion in the thickness direction of the fan blade, this shuffling can also be conducted in the span direction of the blade. This results in interleaving where short plies being interspersed with long plies.

Figure 4A:
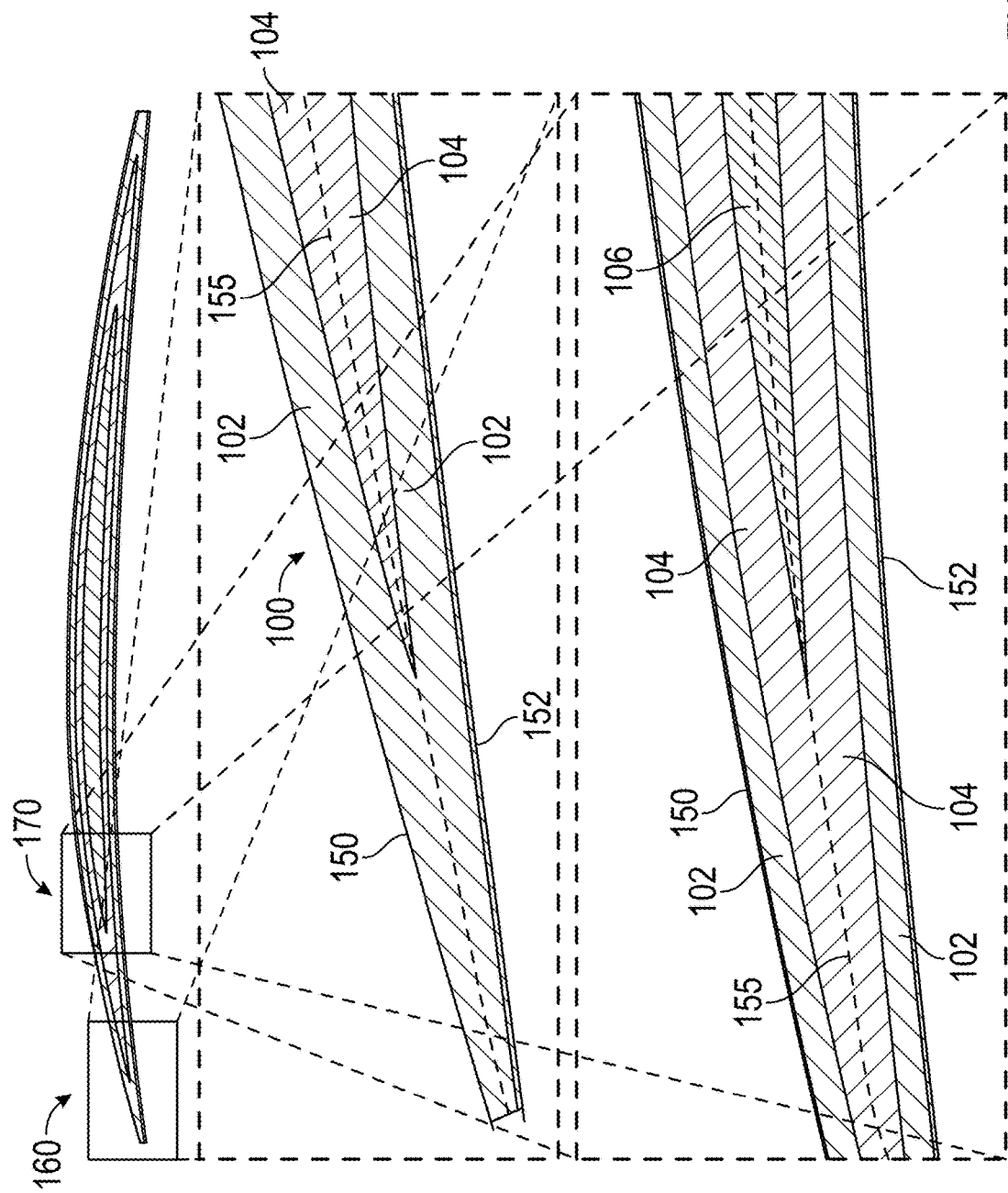
FIG. 4A is a depiction of plies in a conventional uni-ply prepreg layup composite fan blade.
Figure 4B:
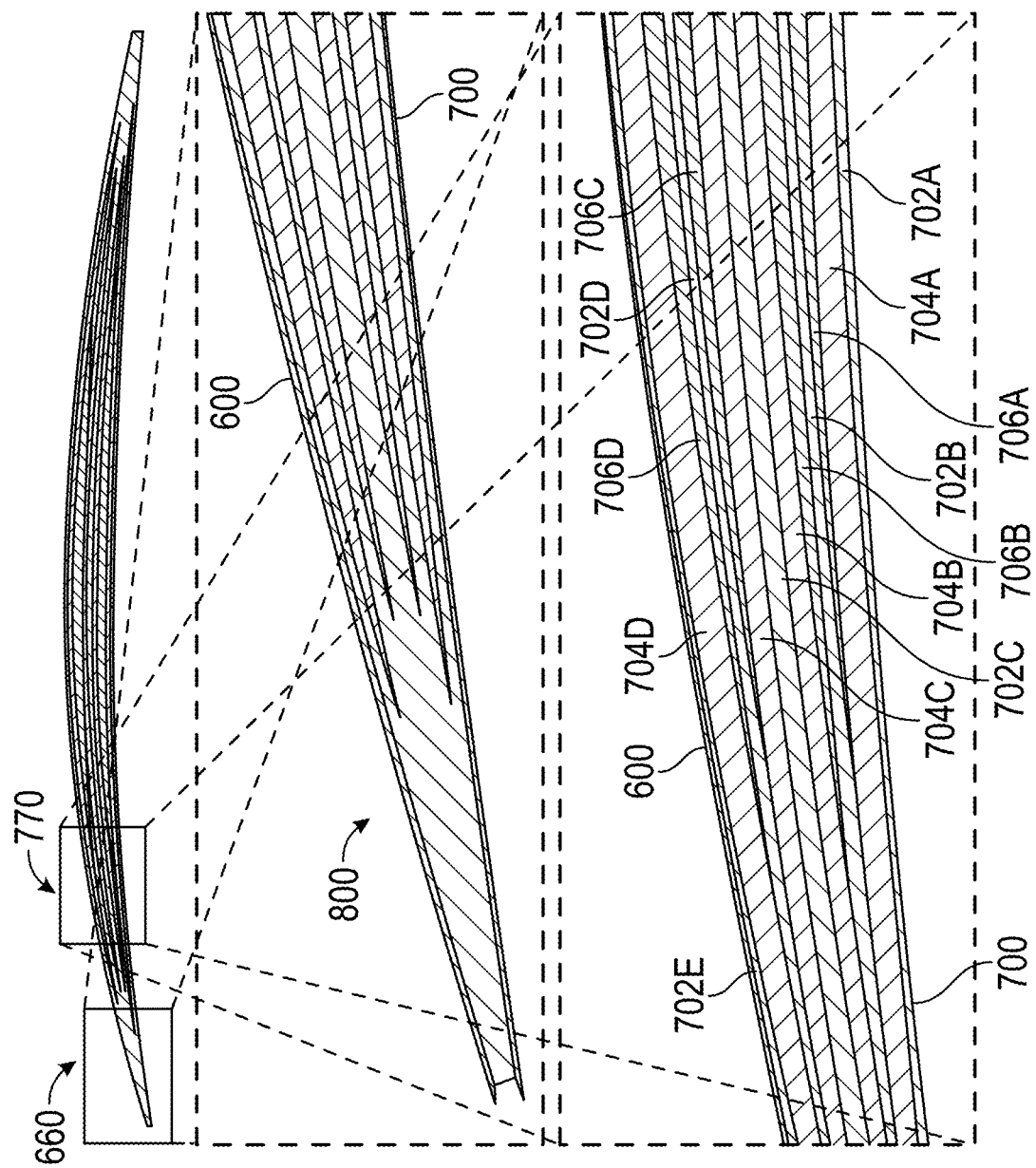
FIG. 4B is a depiction of plies in a fan blade with shuffled plies.

This dispersion and intermixing of plies based on ply size promotes weld and boundary lines between plies to be dispersed thus minimizing the possibility of continuous delamination (delamination across the entire fan blade) occurring along a ply boundary. FIGS. 4A and 4B show how shuffling disperses not only the plies but also the boundary between plies. FIG. 4A depicts the prior art arrangement of plies in a conventional method of manufacturing the fan blade while FIG. 4B depicts the arrangement of plies and the boundary between plies when subjected to shuffling.

FIG. 4A depicts a portion of fan blade (viewed chordwise) proximate to the leading edge (LE) with pressure surface 150 and suction surface 152. FIG. 4A depicts two enlarged sections 160 and 170 of the fan blade. The section 160 depicts the region around the leading edge (LE) of the fan blade, while the section 170 depicts the region proximate to the leading edge. From the two enlarged sections 160 and 170 it can be seen that disposed between the upper camber 150 and the lower camber 152 are a series of plies, notably the widest ply 102, the intermediate ply 104 and the narrowest ply 106 (See FIG. 1 for details). Since there is no interleaving between the plies and the plies are often dropped in only direction, it gives rise to resin-rich areas called resin pockets. In the FIG. 4A, this is depicted by the resin-rich seam 155 at the mid-plane where the plies meet. The resin-rich seam 155 is also called a ply drop. These ply drops occur because of the termination of plies at certain planar locations, to obtain the desired thickness reduction or taper. These ply drops 155 also serve as pathways for delamination between plies. In the FIG. 4A all of the ply drops of the individual plies align at the ply drop 155 to produce a major flaw line, which can lead to an easy delamination.

FIG. 4B depicts a portion of the fan blade 800 (viewed chordwise) proximate to the leading edge (LE) having upper camber 600 and loser camber 700 with interleaved plies contained therebetween. The FIG. 4B depicts two enlarged views 660 and 760 of the fan blade. View 660 is an enlarged sectional view of the region near the leading edge (LE), while view 760 depicts a section of the fan blade proximate to the leading edge. The interleaved plies are arranged as previously described in FIG. 3B (see views 3B3 and 3B4) and the interleaving process will not be detailed here once again. From the FIG. 4B, it may be seen that from the pressure surface to the suction surface of the fan blade, the plies are interleaved (in sequence) as follows—widest ply 702A, intermediate ply 704A, narrowest ply 706A, widest ply 702B, narrowest ply 706B, intermediate ply 704B, widest ply 702C, intermediate ply 704C, narrowest ply 706C, widest ply 702D, narrowest ply 706D, intermediate ply 704D and widest ply 702E.

Because of the interleaving of wider and narrower plies in the FIG. 4B, the ply drops (the resin rich regions) are spaced out and not aligned thus offering a crack an easy path of propagation which can eventually lead to complete delamination of a portion of the fan blade. Furthermore in the central region of the fan blade (i.e., the mid-plane region), the presence of a continuous ply 702C prevents the presence of a ply drop, which prevents the delamination of the fan blade. In summary, the interleaving of plies causes resin concentration to be reduced when compared with fan blades where there is no interleaving.

In one embodiment, one manner of manufacturing the fan blade comprises shuffling plies in a fan blade prior to contacting the plies with one another such that they form interleaved plies. As noted above, interleaving comprises distributing wide plies within narrow plies and short plies within long plies in the fan blade. The interleaving is defined as an actual intersection of a plurality of plies of different variable dimensions that extend in the chordwise direction with another plurality of plies of different variable dimensions that extend in the spanwise direction such that their respective longitudinal axes intersect with one another at angles of 5 to 175 degrees. After laying up the plies as prescribed above, the interleaved plies are cured in an autoclave or similar device. The shuffling of the plies and the positional sequences may be prescribed by a computer.

The interleaving of plies caused by shuffling extends the robustness of the fan blades because they create obstructions in the path of crack propagation. The presence of resin rich regions that offer fertile pathways for delamination are minimized. The plies can be interleaved to obtain a better balance of stress distribution across the fan blade.

In an embodiment, blade robustness is improved as measured by the extent of delamination when compared with a fan blade of the same dimensions that does not contain interleaved plies.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention is not limited to the particular embodiments disclosed as the best mode contemplated for carrying out this invention, but that the invention will include all embodiments falling within the scope of the appended claims.

What is claimed is:

1. A fan blade comprising:
    interleaved plies, where interleaving comprises distributing wide plies within narrow plies and short plies within long plies in the fan blade; wherein the interleaving is defined as an actual intersection of a plurality of plies of different variable dimensions that extend in the chordwise direction with another plurality of plies of different variable dimensions that extend in the spanwise direction such that their respective longitudinal axes intersect with one another at angles of 5 to 175 degrees.

2. The fan blade of claim 1, wherein the wide plies and narrow plies are staggered chordwise with the spanwise staggered long and short plies, or vice versa.

3. The fan blade of claim 1, where interleaving comprises shuffling the short plies with the long plies in the spanwise direction, the wide plies within the narrow plies in the chordwise direction and thick plies with thin plies in the thickness direction to avoid segregating plies of one particular dimension from plies of another particular dimension.

4. The fan blade of claim 3, wherein shuffling comprises splitting plies of different sizes and interspersing them in the fan blade such that there is no progressive dimensional sequencing of ply size in any one particular direction from a given ply in the fan blade.

5. The fan blade of claim 1, where the interleaving is conducted so as to render delamination pathways more tortuous when compared with fan blades where there is no interleaving, thus reducing the speed at which delamination progresses.

6. The fan blade of claim 1, wherein the angle of intersection between the respective longitudinal axes is 50 to 150 degrees.

7. The fan blade of claim 1, wherein the angle of intersection between the respective longitudinal axes is 70 to 120 degrees.

8. The fan blade of claim 1, where the interleaved plies comprise fibers that comprise silicon carbide, oxide ceramics and carbon.

9. The fan blade of claim 8, where the interleaved plies comprise matrices that comprise SiC, $Al_2O_3$, BN, $B_4C$, $Si_3N_4$, $MoSi_2$, $SiO_2$, SiOC, SiNC SiONC, or a combination thereof.

10. The fan blade of claim 1, where the interleaved plies produce fewer regions of resin concentration relative to fan blades that that do not contain interleaved plies.

11. The fan blade of claim 1, wherein fan blade robustness as measured by degree of delamination is decreased by at least 10% when compared with a fan blade of the same dimensions that does not contain interleaved plies.

12. A method of manufacturing a fan blade comprising:
    shuffling plies in a fan blade prior to contacting the plies with one another such that they form interleaved plies; where interleaving comprises distributing wide plies within narrow plies and short plies within long plies in the fan blade; wherein the interleaving is defined as an actual intersection of a plurality of plies of different variable dimensions that extend in the chordwise direction with a another plurality of plies of different variable dimensions that extend in the spanwise direction such that their respective longitudinal axes intersect with one another at angles of 5 to 175 degrees; and
    curing the interleaved plies to form the fan blade.

13. The method of claim 12, wherein shuffling comprises splitting plies of different sizes and interspersing them in the fan blade such that there is no progressive dimensional sequencing of ply size in any one particular direction from a given ply in the fan blade.

14. The method of claim 12 where the shuffling is prescribed by a computer.

15. The method of claim 12, wherein interleaving comprises shuffling short plies with long plies in the spanwise direction, wide plies within narrow plies in the chordwise direction and thick plies with thin plies in the thickness direction to avoid segregating plies of one particular dimension from plies of another particular dimension.

16. The method of claim 12, wherein the interleaved plies produce fewer regions of resin concentration relative to fan blades that that do not contain interleaved plies.

17. The method of claim 12, wherein the angle of intersection between the respective longitudinal axes is 50 to 150 degrees.

18. The method of claim 12, wherein the angle of intersection between the respective longitudinal axes is 70 to 120 degrees.

* * * * *